US012521989B2

(12) United States Patent
Yamaguchi et al.

(10) Patent No.: US 12,521,989 B2
(45) Date of Patent: Jan. 13, 2026

(54) LIQUID EJECTION DEVICE AND CONTROL METHOD OF LIQUID EJECTION DEVICE

(71) Applicant: SEIKO EPSON CORPORATION, Tokyo (JP)

(72) Inventors: Masanobu Yamaguchi, Matsumoto (JP); Koji Kawatani, Shiojiri (JP); Tsuyoshi Hayashi, Shiojiri (JP); Masaaki Ando, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 208 days.

(21) Appl. No.: 18/394,037

(22) Filed: Dec. 22, 2023

(65) Prior Publication Data

US 2024/0208226 A1 Jun. 27, 2024

(30) Foreign Application Priority Data

Dec. 26, 2022 (JP) ................................ 2022-207947

(51) Int. Cl.

| | |
|---|---|
| ***B41J 2/165*** | (2006.01) |
| ***B41J 2/15*** | (2006.01) |
| ***B41J 2/17*** | (2006.01) |
| ***B41J 29/17*** | (2006.01) |
| ***B41M 7/00*** | (2006.01) |

(52) U.S. Cl.

CPC ............ *B41J 2/16532* (2013.01); *B41J 2/15* (2013.01); *B41J 2/16508* (2013.01); *B41J 2/1707* (2013.01); *B41J 2/1721* (2013.01); *B41J 29/17* (2013.01); *B41M 7/0018* (2013.01); *B41P 2235/27* (2013.01)

(58) Field of Classification Search

CPC ...... B41J 2/16532; B41J 2/15; B41J 2/16508; B41J 2/1707; B41J 2/1721; B41J 29/17; B41J 2002/16573; B41J 2/16523; B41J 2/16526; B41J 2/21; B41J 2/16505; B41J 2/16535; B41J 2/16552; B41M 7/0018; B41P 2235/27

See application file for complete search history.

(56) References Cited

U.S. PATENT DOCUMENTS

2018/0244045 A1 * 8/2018 Seki .................... B41J 2/16508

FOREIGN PATENT DOCUMENTS

JP H11-320918 A 11/1999

* cited by examiner

*Primary Examiner* — Douglas X Rodriguez
*Assistant Examiner* — Tracey M McMillion
(74) *Attorney, Agent, or Firm* — WORKMAN NYDEGGER

(57) ABSTRACT

A control method of a liquid ejection device having an ejection unit, and a maintenance unit for maintaining the ejection unit, the ejection unit having a first head having a first nozzle configured to eject the liquid, and a second head having a second nozzle configured to eject the liquid and a third nozzle configured to eject the treatment liquid, the maintenance unit having a first receiving portion configured to receive the liquid, and a second receiving portion configured to receive the treatment liquid, and the control method includes executing a first flushing in which the liquid is ejected from the first nozzle to the first receiving portion, executing a second flushing in which the liquid is ejected from the second nozzle to the first receiving portion, and executing a third flushing in which the processing liquid is ejected from the third nozzle to the second receiving portion.

10 Claims, 5 Drawing Sheets

LIQUID EJECTION DEVICE AND CONTROL METHOD OF LIQUID EJECTION DEVICE

The present application is based on, and claims priority from JP Application Serial Number 2022-207947, filed Dec. 26, 2022, the disclosure of which is hereby incorporated by reference herein in its entirety.

BACKGROUND

1. Technical Field

The present disclosure relates to a liquid ejection device and a control method of the liquid ejection device.

2. Related Art

JP-A-11-320918 shows a liquid ejection device provided with a plurality of heads and a plurality of receiving portions respectively corresponding to the plurality of heads. The liquid ejection device includes a liquid head that ejects a liquid, a treatment liquid head that ejects a treatment liquid for curing the liquid, a liquid receiving portion corresponding to the liquid head, and a treatment liquid receiving portion corresponding to the treatment liquid head. The liquid receiving portion receives liquid ejected from the liquid head for maintenance of the liquid head. The treatment liquid receiving portion receives the treatment liquid from the treatment liquid head for maintenance of the treatment liquid head.

In such a liquid ejection device, one head may be configured to eject both the liquid and the treatment liquid. In this case, when the receiving portion corresponding to the head receives both the liquid and the treatment liquid, there is a risk that the liquid is cured in the receiving portion.

SUMMARY

To solve the above-described problem, a control method of a liquid ejection device having an ejection unit configured to eject a liquid and a treatment liquid for curing the liquid onto a medium while moving in a scanning direction and a maintenance unit for maintaining the ejection unit, the ejection unit having a first head having a first nozzle configured to eject the liquid and a second head having a second nozzle configured to eject the liquid and a third nozzle configured to eject the treatment liquid, the second head is arranged side by side with the first head in the scanning direction, the maintenance unit having a first receiving portion configured to receive the liquid and a second receiving portion configured to receive the treatment liquid, the control method includes executing a first flushing in which the liquid is ejected from the first nozzle to the first receiving portion, executing a second flushing in which the liquid is ejected from the second nozzle to the first receiving portion, and executing a third flushing in which the treatment liquid is ejected from the third nozzle to the second receiving portion.

To solve the above-described problem, a liquid ejection device includes an ejection unit configured to eject a liquid and a treatment liquid for curing the liquid onto a medium while moving in a scanning direction, a maintenance unit configured to maintain the ejection unit, and a control portion, wherein the ejection unit has a first head having a first nozzle configured to eject the liquid and a second head having a second nozzle configured to eject the liquid and a third nozzle configured to eject the processing liquid, the second head is arranged side by side with the first head in the scanning direction, the maintenance unit has a first receiving portion configured to receive the liquid and a second receiving portion configured to receive the processing liquid, and the control portion executes a first flushing in which the liquid is ejected from the first nozzle to the first receiving portion, executes a second flushing in which the liquid is ejected from the second nozzle to the first receiving portion, and executes a third flushing in which the treatment liquid is ejected from the third nozzle to the second receiving portion.

DESCRIPTION OF EMBODIMENTS

Hereinafter, an embodiment of the liquid ejection device will be described with reference to the drawings. The liquid ejection device is, for example, an inkjet printer that records images such as characters or photographs by ejecting ink, which is an example of liquid, onto a medium such as paper or fabric.

Figure 1:
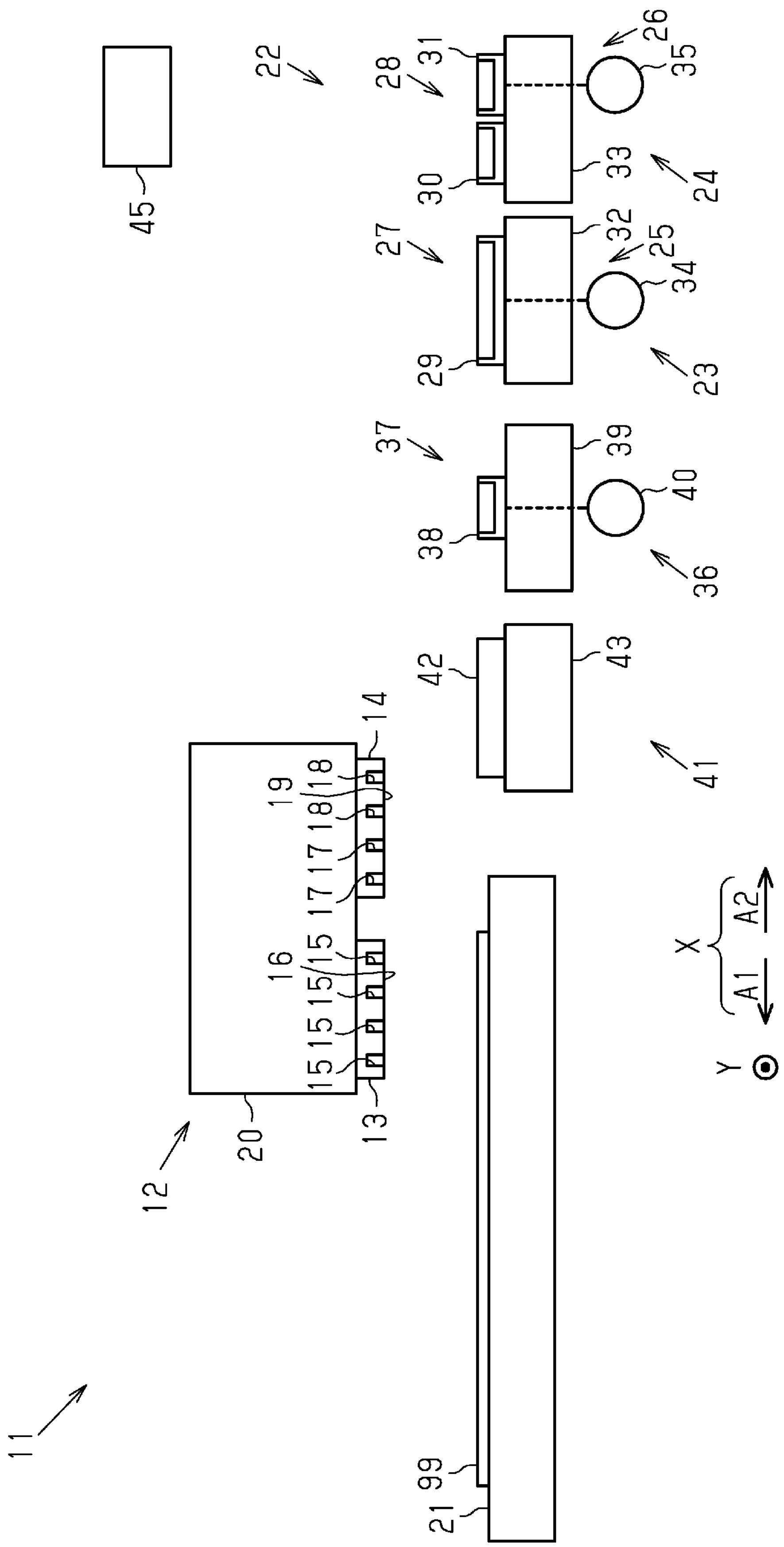
FIG. 1 is a front view showing an embodiment of a liquid ejection device.

As shown in FIG. 1, a liquid ejection device 11 includes an ejection unit 12. The ejection unit 12 is configured to eject a liquid and a treatment liquid. The treatment liquid is a reaction liquid for curing the liquid. The treatment liquid increases the viscosity of the liquid by encountering the liquid. That is, the viscosity of the mixed liquid of the liquid and the treatment liquid is higher than the viscosity of the liquid. As a result, the liquid is cured. The treatment liquid includes a component that cures the liquid by reacting with the liquid, that is, a component that cures the mixed liquid. The treatment liquid cures the liquid, for example, by aggregating the pigments contained in the liquid.

The ejection unit 12 ejects the liquid and the treatment liquid onto a medium 99. The ejection unit 12 ejects the liquid and the treatment liquid onto the medium 99 which is transported in the transport direction Y. The ejection unit 12 ejects the liquid and the treatment liquid onto the medium 99 while moving in the scanning direction X. The ejection unit 12 ejects the treatment liquid onto the medium 99 after ejecting the liquid onto the medium 99. By this, the liquid ejected onto the medium 99 is cured.

The ejection unit 12 includes a plurality of heads. The ejection unit 12 includes a first head 13 and a second head 14. The first head 13 and the second head 14 are arranged in one direction. In detail, the first head 13 and the second head 14 are arranged side by side in the scanning direction X. The scanning direction X is a direction in which the first head 13 and the second head 14 scan the medium 99. That is, the liquid ejection device 11 is a serial printer that can perform printing over the entire width of the medium 99 by moving the head. The scanning direction X indicates both directions including a first direction A1 and a second direction A2 opposite to the first direction A1. For example, the first head 13 and the second head 14 are arranged in this order in the second direction A2.

The first head 13 includes one or more first nozzles 15 that eject liquid. Specifically, the first head 13 has a first nozzle surface 16 in which one or more first nozzles 15 are opened. The first head 13 may eject a plurality of liquids from the plurality of first nozzles 15. For example, the first head 13 ejects four types of liquids from the plurality of first nozzles 15. Four kinds of liquids are, for example, color inks of different colors.

The plurality of first nozzles 15 may constitute a plurality of nozzles rows. For example, the plurality of first nozzles 15 forms four nozzles rows. Four nozzles rows respectively eject color inks of different colors.

The second head 14 includes one or more second nozzles 17 that eject liquid and one or more third nozzles 18 that eject the treatment liquid. Specifically, the second head 14 has a second nozzle surface 19 in which one or more second nozzles 17 and one or more third nozzles 18 are opened. The second head 14 is configured to eject both liquid and the treatment liquid.

The second head 14 may discharge a plurality of kinds of liquids from the plurality of second nozzles 17. For example, the second head 14 ejects two kinds of liquids from the plurality of second nozzles 17. Two kinds of liquids are, for example, color inks different in color from the liquids ejected by the first head 13. Therefore, the ejection unit 12 can eject a total of six kinds of color inks.

The plurality of second nozzles 17 may constitute a plurality of nozzles rows. For example, the plurality of second nozzles 17 forms two nozzles rows. The two nozzle rows eject color inks of different colors.

The plurality of third nozzles 18 may form a plurality of nozzles rows. For example, the plurality of third nozzles 18 forms two nozzles rows. The two nozzles rows eject the same type of treatment liquid.

The plurality of second nozzles 17 and the plurality of third nozzles 18 are collectively arranged on the second nozzle surface 19. For example, the two nozzles rows of the plurality of third nozzles 18 are positioned at the second direction A2 side with respect to the two nozzles rows of the plurality of second nozzles 17. Therefore, in the ejection unit 12, the first nozzles 15, the second nozzles 17, and the third nozzles 18 are positioned in this order in the second direction A2.

The ejection unit 12 includes a carriage 20. A plurality of heads are mounted on the carriage 20. The first head 13 and the second head 14 are mounted on the carriage 20. The carriage 20 is configured to move in the scanning direction X. Since the carriage 20 moves in the scanning direction X, the first head 13 and the second head 14 move in the scanning direction X.

The carriage 20 may be configured to move toward or away from the medium 99. The carriage 20 may be configured to move vertically, for example. As the carriage 20 moves vertically, the distance between the medium 99 and the head is adjusted. As the carriage 20 moves vertically, the head can be brought close to a maintenance unit 22 (to be described later).

The liquid ejection device 11 includes a support portion 21. The support portion 21 supports the medium 99 to be transported. The medium 99 is transported in the transport direction Y on the support portion 21. The liquid and the treatment liquid are ejected to the medium 99 supported by the support portion 21. That is, the liquid and the treatment liquid are ejected to the medium 99 while the ejection unit 12 moves in the region facing the support portion 21.

The liquid ejection device 11 includes a maintenance unit 22. The maintenance unit 22 is configured to maintain the ejection unit 12. The maintenance unit 22 is arranged side by side with the support portion 21 in the scanning direction X. For example, the maintenance unit 22 is positioned in the second direction A2 side of the support portion 21.

The maintenance unit 22 performs maintenance on the ejection unit 12 facing the maintenance unit 22. The maintenance unit 22 faces the ejection unit 12 located at the origin position. The origin position is a position at which the ejection unit 12 switches movement from the second direction A2 to the first direction A1 during printing. Therefore, during printing, the ejection unit 12 temporarily stops at the origin position. The origin position may be a standby position of the ejection unit 12 before the start of printing. At the start of printing and during printing, the ejection unit 12 moves from the origin position in the first direction A1. That is, the ejection unit 12 moves from a position facing the maintenance unit 22 toward a position facing the support portion 21.

The maintenance unit 22 has a plurality of receiving mechanisms. The maintenance unit 22 includes a first receiving mechanism 23 and a second receiving mechanism 24. The receiving mechanism receives the liquid and the treatment liquid ejected from the nozzles by flushing. Flushing is maintenance in which liquid that does not contribute to printing and a treatment liquid are ejected from a nozzle in order to suppress clogging of the nozzle. Flushing is appropriately executed at the start of printing or during printing. The maintenance unit 22 maintains the ejection unit 12 by the receiving mechanism receiving the liquid and the treatment liquid of flushing.

The first receiving mechanism 23 and the second receiving mechanism 24 are arranged side by side in the scanning direction X. The first receiving mechanism 23 and the second receiving mechanism 24 may be arranged so as to correspond to the positions of the first head 13 and the second head 14. For example, the first receiving mechanism 23 and the second receiving mechanism 24 are arranged in this order in the second direction A2. By this, when the first receiving mechanism 23 faces the first head 13, the second receiving mechanism 24 can face the second head 14.

The first receiving mechanism 23 and the second receiving mechanism 24 each have a receiving portion. The first receiving mechanism 23 includes a first receiving portion 25. The second receiving mechanism 24 has a second receiving portion 26. The receiving portion receives the liquid and the treatment liquid. Specifically, the receiving portion receives the liquid of flushing and the treatment liquid of flushing. The receiving portion may receive not only the liquid and the treatment liquid of flushing but also the liquid and the treatment liquid ejected from the nozzles in accordance with other maintenance. The receiving portion may receive, for example, the liquid and the treatment liquid forcibly ejected from the nozzles by cleaning.

Figure 2:
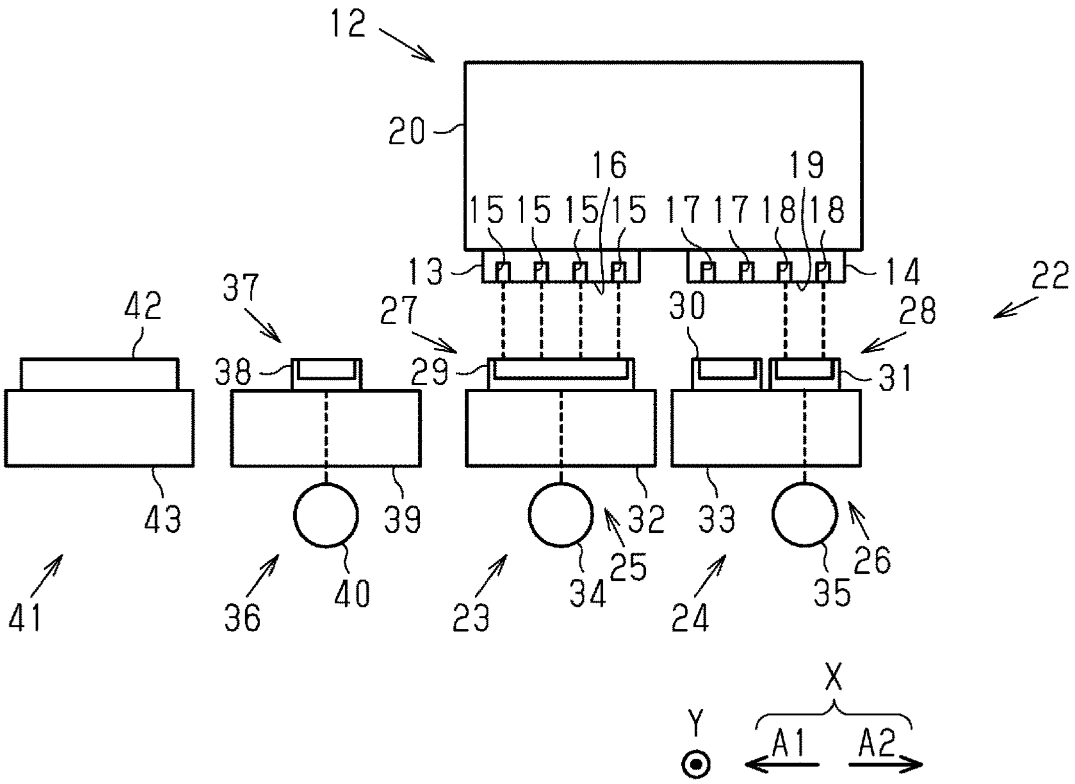
FIG. 2 is a front view when the first and third flushings are executed.
Figure 3:
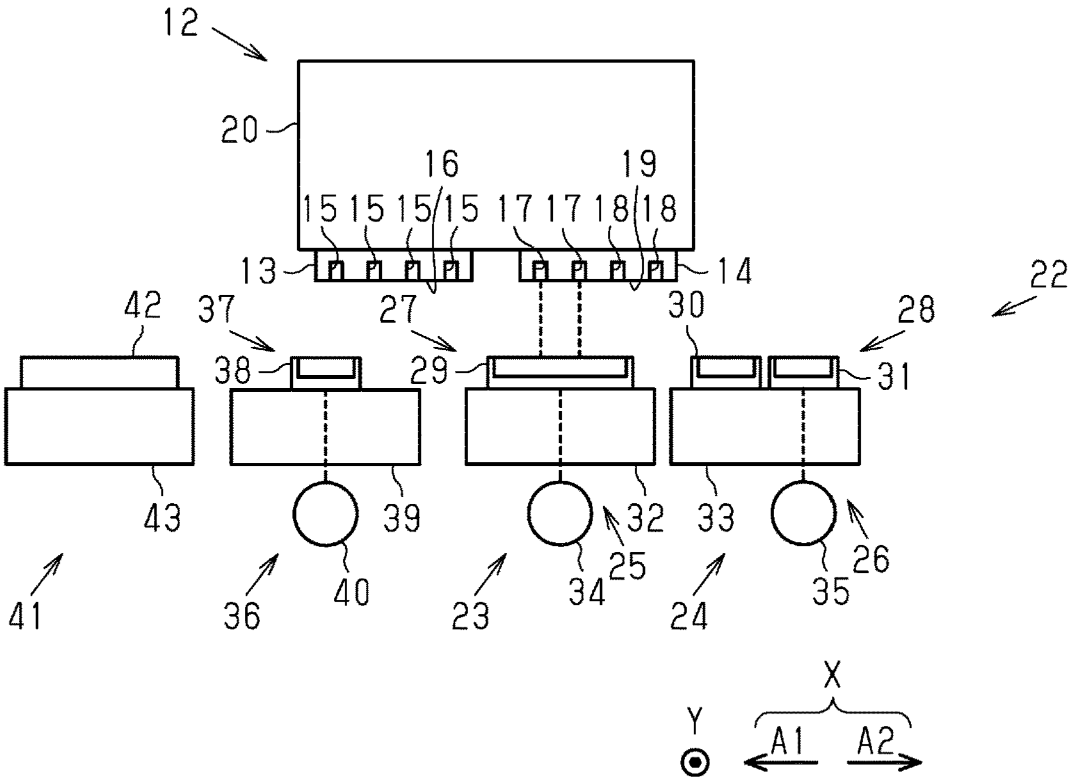
FIG. 3 is a front view when the second flushing is executed.

As shown in FIGS. 2 and 3, a first receiving portion 25 is configured to receive the liquid ejected from the first head 13. The first receiving portion 25 receives the liquid of a first flushing from the first head 13 opposing the first receiving portion 25. The first flushing is flushing by the first nozzles 15. Since the first receiving portion 25 receives the liquid of the first flushing, the first nozzles 15 are maintained.

The first receiving portion 25 is configured to receive the liquid ejected from the second head 14. The first receiving portion 25 receives the liquid of the second flushing from the second head 14 facing the first receiving portion 25. The second flushing is flushing by the second nozzles 17. The second nozzles 17 are maintained by the first receiving portion 25 receiving the liquid of the second flushing.

The second receiving portion 26 is configured to receive the treatment liquid ejected from the second head 14. The second receiving portion 26 receives the treatment liquid of the third flushing from the second head 14 facing the second receiving portion 26. The third flushing is flushing by the third nozzles 18. The third nozzles 18 are maintained by the second receiving portion 26 receiving the treatment liquid of the third flushing.

The first receiving portion 25 and the second receiving portion 26 separately receive the liquid and the treatment liquid. Therefore, the risk that the liquid and the treatment liquid are mixed in the receiving portion is reduced. If the liquid and the treatment liquid are mixed in the receiving portion, there is a risk that the life of the receiving portion may be shortened due to the curing of the liquid.

The first receiving portion 25 and the second receiving portion 26 respectively face the first head 13 and the second head 14 when the ejection unit 12 is positioned at the origin position. Therefore, the first receiving portion 25 and the second receiving portion 26 respectively receive the liquid and the treatment liquid of flushing from the ejection unit 12 positioned at the origin position.

The first receiving portion 25 and the second receiving portion 26 may each have a cap portion. The first receiving portion 25 may have a first cap portion 27. The second receiving portion 26 may have a second cap portion 28. The first receiving portion 25 and the second receiving portion 26 are not limited to receiving the liquid and the treatment liquid of flushing, and the head may be capped by a cap portion. The first receiving portion 25 and the second receiving portion 26 may perform maintenance of the head by the capping. Capping means to form a space communicating with the nozzles by contacting the cap portion with the nozzle surface. The nozzles are maintained moist by capping.

The first receiving portion 25 may include a tray that simply receives the liquid instead of the first cap portion 27. In this case, the first receiving portion 25 can receive the liquid of the first and second flushings.

Instead of the second cap portion 28, the second receiving portion 26 may have a tray for simply receiving the treatment liquid. In this case, the second receiving portion 26 can receive the treatment liquid of the third flushing.

Figure 4:
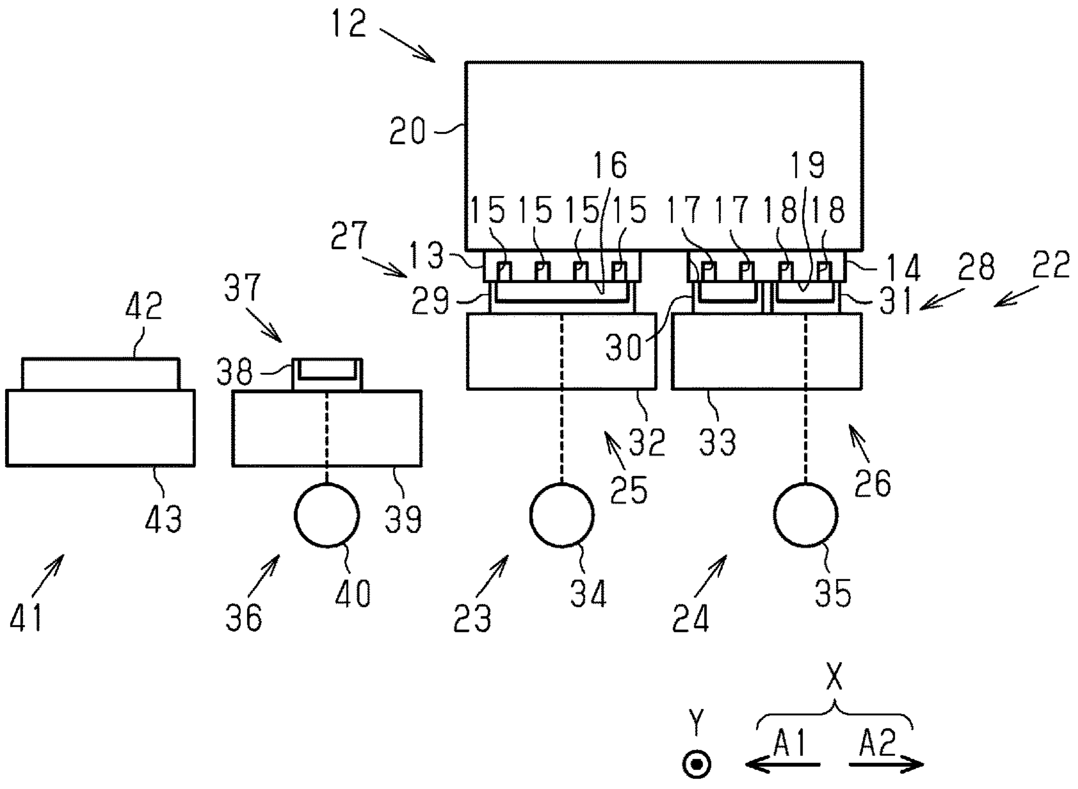
FIG. 4 is a front view when the first and third suction cleaning are executed.

As shown in FIG. 4, the first cap portion 27 is configured to form a space communicating with the first nozzles 15 by contacting the first nozzle surface 16. The first cap portion 27 executes the first capping on the first head 13 facing the first cap portion 27. The first capping is the capping of the first nozzles 15 by the first cap portion 27. The first cap portion 27 maintains the first nozzles 15 moist by the first capping. In this way, the first receiving portion 25 may perform maintenance of the first head 13 using the first capping.

The second cap portion 28 is configured to form a space communicating with the second nozzles 17 and a space communicating with the third nozzles 18 by contacting the second nozzle surface 19. The second cap portion 28 executes the second and third cappings on the second head 14 facing the second cap portion 28. The second capping is the capping of the second nozzles 17 by the second cap portion 28. The third capping is the capping of the third nozzles 18 by the second cap portion 28. The second cap portion 28 maintains the second nozzles 17 moist by the second capping. The second receiving portion 26 maintains the third nozzles 18 moist by the third capping.

The first cap portion 27 and the second cap portion 28 each include one or more caps. For example, the first cap portion 27 has one cap, and the second cap portion 28 has two caps. Specifically, the first cap portion 27 has one first cap 29. The second cap portion 28 includes one second cap 30 and one third cap 31. The cap receives the liquid and the treatment liquid of flushing. The first cap 29 receives the liquid of the first and second flushings. The third cap 31 receives the treatment liquid of the third flushing. The head is capped by the cap contacting the nozzle surface.

The first cap 29 executes the first capping by contacting the first nozzle surface 16. The first cap 29 covers all the first nozzles 15 by the first capping. That is, the first cap 29 collectively caps the four rows of the first nozzles 15 that eject different colors. The first cap portion 27, for example, may have a plurality of first caps 29 corresponding to the number of nozzle rows. In this case, the plurality of first caps 29 cap the nozzle rows one by one.

The second cap 30 executes the second capping by contacting the second nozzle surface 19. The second cap 30 covers all the second nozzles 17 by the second capping. In other words, the second cap 30 collectively caps the two rows of second nozzles 17 that eject different colors. The second cap portion 28, for example, may have a plurality of second caps 30 corresponding to the number of nozzle rows. In this case, the plurality of second caps 30 caps the nozzle rows one by one.

The third cap 31 executes third capping by contacting the second nozzle surface 19. The third cap 31 covers all of the third nozzles 18 by third capping. The second cap portion 28, for example, may have a plurality of third caps 31 corresponding to the number of nozzle rows. In this case, the plurality of third caps 31 caps the nozzle rows one by one.

The second cap 30 and the third cap 31 are arranged side by side in the scanning direction X. The second cap 30 and the third cap 31 may be arranged so as to correspond to the positions of the second nozzles 17 and the third nozzles 18. For example, the second cap 30 and the third cap 31 are arranged in this order side by side in the second direction A2. By this, the second cap 30 can cap the second nozzles 17, and the third cap 31 can cap the third nozzles 18. That is, the second cap portion 28 can simultaneously execute the second and third cappings.

The first receiving portion 25 and the second receiving portion 26 may each have a cap base. The first receiving portion 25 has a first cap base 32. The second receiving portion 26 has a second cap base 33. The cap base is a foundation that supports the cap. The cap base may be configured to move the cap toward and away from the head. The cap base may, for example, be configured to move the cap vertically. By this, the cap base can cause the cap to approach the head. The capping is executed by the cap base causing the cap to approach the head.

The first cap base 32 supports the first cap 29. The second cap base 33 supports the second cap 30 and the third cap 31. Therefore, for example, the second cap base 33 vertically moves the second cap 30 and the third cap 31 together. By this, the second and third cappings are simultaneously executed. The second cap base 33 may be configured to individually move the second cap 30 and the third cap 31. In this case, the second cap portion 28 can separately execute the second and third cappings.

The first receiving mechanism 23 and the second receiving mechanism 24 may each have a suction portion. The first receiving mechanism 23 may have a first suction portion 34. The second receiving mechanism 24 may have a second suction portion 35. The suction portion includes, for example, a pump. The first receiving mechanism 23 and the second receiving mechanism 24 are not limited to flushing and the capping, and the maintenance of the head may be performed by executing suction cleaning on the head by the suction portion. Suction cleaning is maintenance for discharging air bubbles and foreign matter together with the liquid from the nozzles by suctioning the liquid from the nozzles. Suction cleaning is executed by the suction portion suctioning the inside of the cap.

The first suction portion 34 is coupled to the first cap 29. The first suction portion 34 suctions the inside of the first cap 29. In a state where the first capping is executed, the first suction portion 34 suctions the inside of the first cap 29, and thus the first suction cleaning is executed. The first suction cleaning is cleaning for suctioning the liquid from the first nozzles 15.

The second suction portion 35 is coupled to the third cap 31. The second suction portion 35 suctions the inside of the third cap 31. The third suction cleaning is executed by the second suction portion 35 suctioning the inside of the third cap 31 in a state where the third capping is executed. The third suction cleaning is cleaning for suctioning the treatment liquid from the third nozzles 18.

The maintenance unit 22 may have a suction mechanism 36. The suction mechanism 36 is configured to execute the second suction cleaning. The second suction cleaning is cleaning by suctioning the liquid from the second nozzles 17. Therefore, the suction mechanism 36 receives the liquid ejected from the second nozzles 17. The suction mechanism 36 is located side by side in the scanning direction X with the first receiving mechanism 23 and the second receiving mechanism 24. For example, the suction mechanism 36 is located further in the first direction A1 side than are the first receiving mechanism 23 and the second receiving mechanism 24.

The suction mechanism 36 includes a cap portion. That is, the suction mechanism 36 has a third cap portion 37. The third cap portion 37 is configured so as to form a space communicating with the second nozzles 17 by contacting the second nozzle surface 19. That is, the third cap portion 37 executes the fourth capping on the second head 14 facing the third cap portion 37. The fourth capping is capping of the second nozzles 17 by the third cap portion 37. The fourth capping is executed not for maintaining the second nozzles 17 moist but for suction cleaning of the second nozzles 17.

The third cap portion 37 has one or more caps. For example, the third cap portion 37 has one cap. Specifically, the third cap portion 37 includes one fourth cap 38.

Figure 5:
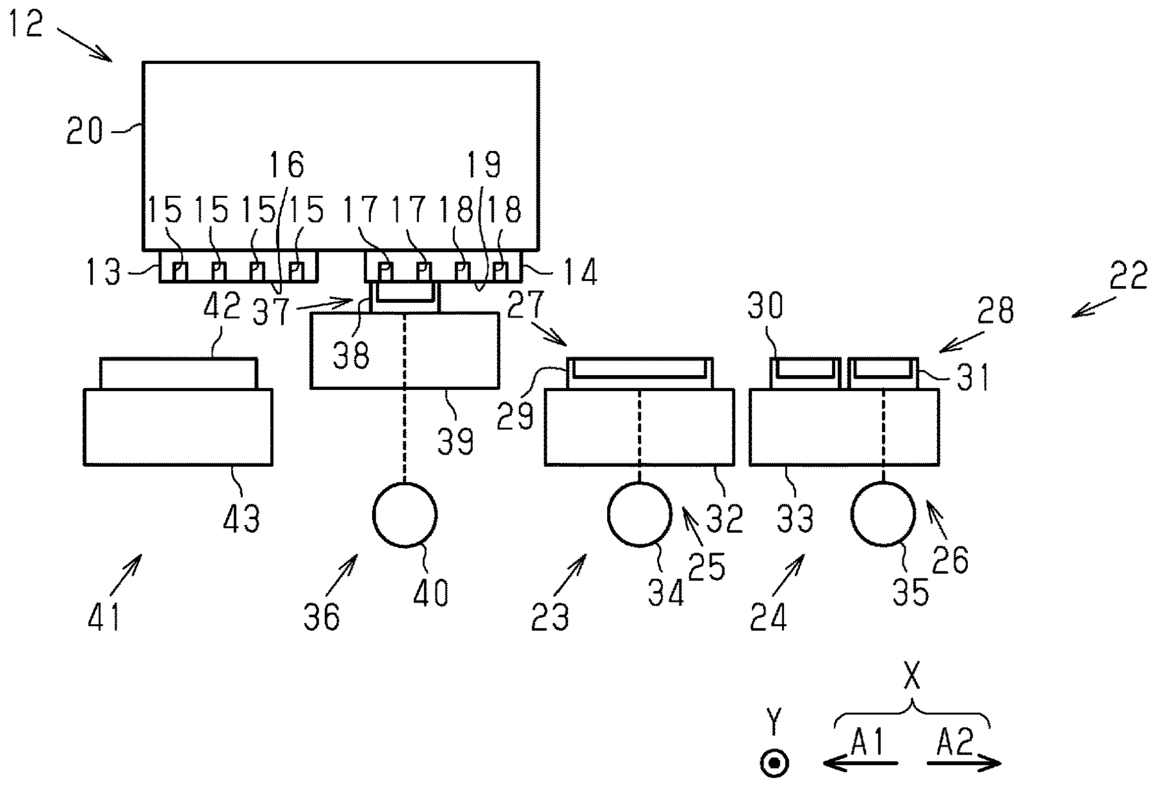
FIG. 5 is a front view when the second suction cleaning is executed.

As shown in FIG. 5, the fourth cap 38 contacts the second nozzle surface 19 to execute the fourth capping. The fourth cap 38 covers all the second nozzles 17 by the fourth capping. That is, the fourth cap 38 collectively caps the second nozzles 17 in the two rows that eject different colors. The third cap portion 37 may have, for example, a plurality of fourth caps 38 corresponding to the number of nozzle rows. In this case, the plurality of fourth caps 38 caps the nozzle rows one by one.

The suction mechanism 36 may have the cap base. The suction mechanism 36 may have a third cap base 39. The third cap base 39 supports the fourth cap 38.

The suction mechanism 36 includes the suction portion. The suction mechanism 36 includes a third suction portion 40. The third suction portion 40 is coupled to the fourth cap 38. The third suction portion 40 suctions the inside of the fourth cap 38. The second suction cleaning is executed by the third suction portion 40 suctioning the inside of the fourth cap 38 in a state where the fourth capping is executed.

Figure 6:
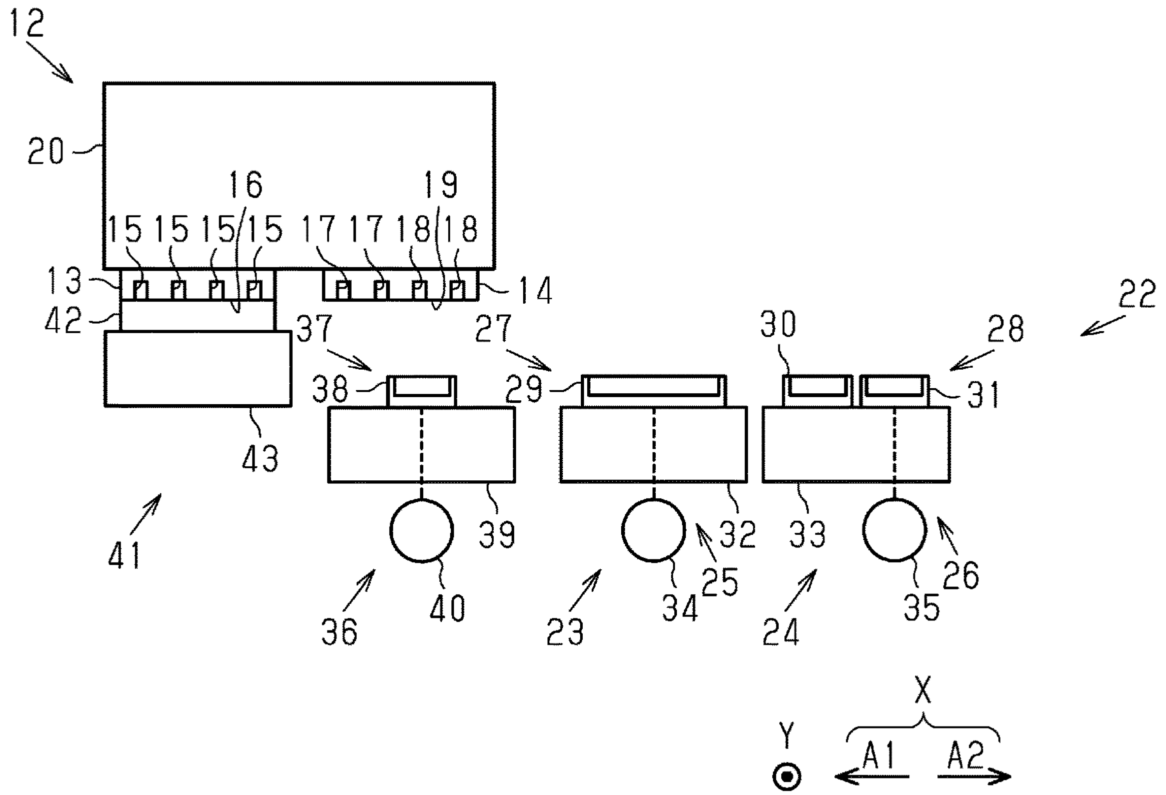
FIG. 6 is a front view when wiping is performed.

As shown in FIG. 6, the maintenance unit 22 may have a wiping mechanism 41. The wiping mechanism 41 is a mechanism that performs maintenance of the head by wiping. Wiping is maintenance for wiping the nozzle surface. Wiping removes liquid, treatment liquid, foreign matter, and the like adhering to the nozzle surface.

It is preferable that the wiping mechanism 41 wipes the nozzle surface of the head on which suction cleaning was performed. When the suction cleaning is executed, the liquid and the treatment liquid are discharged from the nozzle, so that the liquid and the treatment liquid adhere to the nozzle surface. Therefore, the wiping mechanism 41 can remove the liquid and the treatment liquid from the nozzle surface by wiping the head after suction cleaning has been performed.

The wiping mechanism 41 is located side by side in the scanning direction X with the first receiving mechanism 23, the second receiving mechanism 24, and the suction mechanism 36. For example, the wiping mechanism 41 is positioned in the first direction A1 with respect to the suction mechanism 36.

The wiping mechanism 41 has a wiping member 42. The wiping member 42 is a member for wiping the nozzle surface. Wiping is executed by bringing the wiping member 42 into contact with the nozzle surface. The wiping member 42 is formed of, for example, elongated fabric.

The wiping member 42 wipes the first nozzle surface 16 and the second nozzle surface 19. The wiping member 42 wipes the nozzle surface of each head. The wiping mechanism 41 is configured such that an unused portion of the wiping member 42 is sequentially wound out each time the wiping member 42 wipes the nozzle surface. By this, a risk that the liquid and the treatment liquid are mixed in the wiping member 42 is reduced.

The wiping mechanism 41 includes a holder 43. The holder 43 holds the wiping member 42. The holder 43 may be configured to move toward or away from the head. That is, the holder 43 may be configured to move vertically. The wiping member 42 contacts the nozzle surface by the holder 43 approaching the head.

The holder 43 may be configured to move in the transport direction Y. In this case, wiping is executed by the holder 43 moving in the transport direction Y in a state in which the wiping member 42 is in contact with the nozzle surface. During wiping, the ejection unit 12 may move in the transport direction Y with respect to the wiping mechanism 41.

As shown in FIG. 1, the liquid ejection device 11 includes a control portion 45. The control portion 45 controls various configurations included in the liquid ejection device 11. The control portion 45 controls, for example, the ejection unit 12 and the maintenance unit 22.

The control portion 45 may be configured with one or more processors that execute various processes according to a computer program. The control portion 45 may be configured by one or more dedicated hardware circuits such as an ASIC that executes at least a part of various processes. The control portion 45 may be constituted by a circuit including a combination of a processor and a hardware circuit. The processor includes a CPU and memory, such as RAM and ROM. The memory stores the program code or instructions configured to cause the CPU to execute the processing. The memory, that is, the computer readable medium, includes any readable media that can be accessed by a general purpose or dedicated computer.

Flowchart

Next, an example of a flushing process executed by the control portion 45 will be described. The flushing process is a process of executing flushing. The flushing process includes, for example, the processes of executing the first, second, and third flushings. The control portion 45 executes the flushing process as appropriate before the start of printing or during printing. The control portion 45 executes the flushing process at the timing when the ejection unit 12 is located at the origin position. The control portion 45 operates in accordance with the flowchart shown in FIG. 7 by executing the flushing process.

Figure 7:
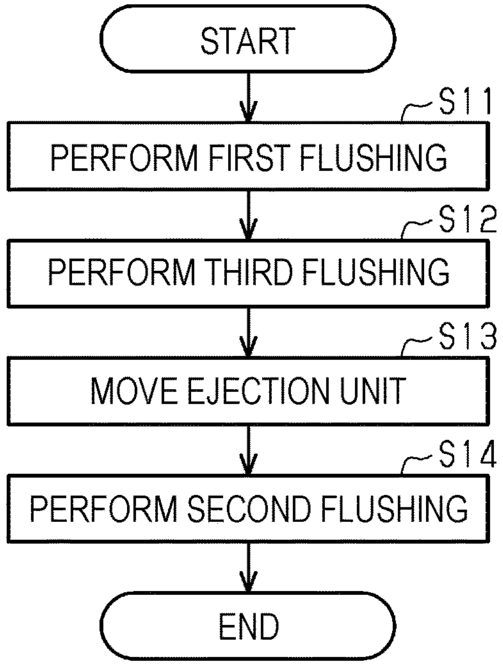
FIG. 7 is a flowchart showing an example of a flushing process.

As shown in FIG. 7, in step S11, the control portion 45 executes the first flushing on the first receiving portion 25. At this time, the control portion 45 causes the liquid to be ejected from the first nozzles 15 to the first receiving portion 25 in a state where the first head 13 faces the first receiving portion 25. For example, the control portion 45 causes the liquid to be ejected from the first nozzles 15 to the first receiving portion 25 in a state where the ejection unit 12 is positioned at the origin position. Therefore, the control portion 45 causes the liquid to be ejected from the first nozzles 15 to the first receiving portion 25 in a state where the ejection unit 12 is stopped.

In step S12, the control portion 45 executes the third flushing on the second receiving portion 26. At this time, the control portion 45 causes the treatment liquid to be ejected from the third nozzles 18 to the second receiving portion 26 in a state where the second head 14 faces the second receiving portion 26. For example, the control portion 45 causes the third nozzles 18 to eject the treatment liquid to the second receiving portion 26 in a state where the ejection unit 12 is located at the origin position. Therefore, the control portion 45 causes the third nozzles 18 to eject the treatment liquid to the second receiving portion 26 in a state where the ejection unit 12 is stopped.

The control portion 45 may execute the processing of step S12 first or simultaneously with the processing of step S11. Since the second head 14 faces the second receiving portion 26 in a state where the first head 13 faces the first receiving portion 25, the control portion 45 can simultaneously execute the first and third flushings. The control portion 45 may execute the third flushing after executing the first flushing and after executing control to move the ejection unit 12 to a position where the second head 14 faces the second receiving portion 26. The control portion 45 may execute the first flushing after executing the third flushing and after executing control to move the ejection unit 12 to a position where the first head 13 faces the first receiving portion 25.

In step S13, the control portion 45 executes control to move the ejection unit 12. Specifically, the control portion 45 executes control to move the ejection unit 12 from the origin position to the first direction A1 after executing the first and third flushings. By this, the second head 14 moves toward a region facing the first receiving portion 25.

In step S14, the control portion 45 executes the second flushing on the first receiving portion 25. That is, the control portion 45 executes the second flushing after executing the first flushing and the third flushing. At this time, the control portion 45 causes the liquid to be ejected from the second nozzles 17 to the first receiving portion 25 in a state where the second head 14 faces the first receiving portion 25. For example, the control portion 45 causes the second nozzles 17 to eject the liquid to the first receiving portion 25 in a state where the ejection unit 12 is moving. Since the second flushing is executed while the ejection unit 12 is moving, the time required for flushing is shorter than in a case where the second flushing is executed after the ejection unit 12 is stopped. In particular, in a case where the flushing process is executed during printing, the risk that the time required for printing becomes long is reduced.

Upon completion of the processing of step S14, the control portion 45 ends the flushing process. After finishing the flushing process, the control portion 45 may perform printing on the medium 99 by executing control to move the ejection unit 12 in the first direction A1, or may return the ejection unit 12 to the origin position by executing control to move the ejection unit 12 in the second direction A2.

Next, an example of the suction cleaning process executed by the control portion 45 will be described. The suction cleaning process is a process of executing suction cleaning. The suction cleaning process includes, for example, a first suction cleaning process, a second suction cleaning process, and a third suction cleaning process. The control portion 45 executes the suction cleaning process at appropriate times, such as before the start of printing or after the end of printing. The control portion 45 executes the suction cleaning process when the ejection unit 12 is positioned at the origin position. The control portion 45 operates according to the flowchart shown in FIG. 8 by executing the suction cleaning process.

Figure 8:
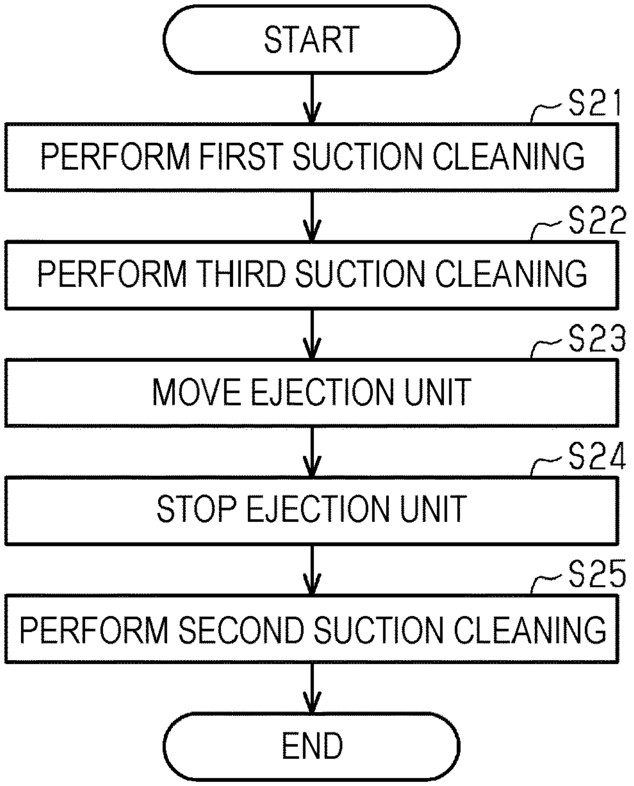
FIG. 8 is a flowchart showing an example of the suction cleaning process.

As shown in FIG. 8, the control portion 45 executes the first suction cleaning in step S21. At this time, the control portion 45 causes the first cap 29 to cap the first head 13. That is, the control portion 45 executes the first capping. The control portion 45 causes the first suction portion 34 to suck the inside of the first cap 29 in a state where the first capping is executed. By this, the first suction cleaning is executed.

In step S22, the control portion 45 executes the third suction cleaning. At this time, the control portion 45 causes the third cap 31 capping the second head 14. That is, the control portion 45 executes the third capping. The control portion 45 causes the second suction portion 35 to suck the inside of the third cap 31 in a state where the third capping is executed. By this, the third suction cleaning is executed.

The control portion 45 may execute the processing of step S22 first or may execute to process simultaneously with the processing of steps S21 and S22. Since the second head 14 faces the third cap 31 in a state where the first head 13 faces the first cap 29, the control portion 45 can simultaneously execute the first and third cappings. Therefore, the control portion 45 can simultaneously execute the first and third suction cleanings. The control portion 45 may execute the third suction cleaning after executing the first suction cleaning and after moving the ejection unit 12 to a position where the second head 14 faces the third cap 31. The control portion 45 may execute the first suction cleaning after executing the third suction cleaning and after executing control to move the ejection unit 12 to a position where the first head 13 faces the first cap 29.

In step S23, the control portion 45 executes control to move the ejection unit 12. Specifically, the control portion 45 executes control to move the ejection unit 12 from the origin position in the first direction A1 after executing the first and third suction cleanings. By this, the second head 14 moves in the region where it faces the fourth cap 38.

In step S24, the control portion 45 executes control to stop the ejection unit 12. More specifically, the control portion 45 executes control to stop the ejection unit 12 so that the second nozzles 17 of the second head 14 faces the fourth cap 38. That is, the control portion 45 executes control to stop the ejection unit 12 at a position where the fourth capping can be performed.

In step S25, the control portion 45 executes the second suction cleaning. At this time, the control portion 45 causes the fourth cap 38 to cap the second head 14. That is, the control portion 45 executes the fourth capping. The control portion 45 causes the third suction portion 40 to suction the inside of the fourth cap 38 in a state where the fourth capping is executed. By this, the second suction cleaning is executed.

When the process of step S25 is finished, the control portion 45 finishes the suction cleaning process. The control portion 45 may wipe the first nozzle surface 16 and the second nozzle surface 19 by the wiping mechanism 41 after the suction cleaning process is finished. After wiping is completed, the control portion 45 may perform capping with the first cap 29, the second cap 30, and the third cap 31. By this, the state of the nozzles is favorably maintained.

Operation and Effect

Next, operation and effects of the above embodiment will be described.

(1) The control portion 45 executes the first flushing for ejecting the liquid from the first nozzles 15 to the first receiving portion 25. The control portion 45 executes the second flushing in which the liquid is ejected from the second nozzles 17 to the first receiving portion 25. The control portion 45 executes the third flushing for ejecting the treatment liquid from the third nozzles 18 to the second receiving portion 26.

According to the above-described configuration, the first receiving portion 25 and the second receiving portion 26 separately receive the liquid and the treatment liquid, respectively. By this, the risk that the liquid and the treatment liquid are mixed in the first receiving portion 25 and the risk that the liquid and the treatment liquid are mixed in the second receiving portion 26 are reduced. Therefore, the risk that the liquid is cured in the receiving portion is reduced.

(2) The control portion 45 executes the second flushing after executing the first and third flushings.

According to the above-described configuration, because the second and third flushings are not executed simultaneously, the risk that the liquid and the treatment liquid are mixed is reduced.

(3) The control portion 45 executes the first flushing in a state where the ejection unit 12 is stopped. The control portion 45 executes the second flushing in a state in which the ejection unit 12 is moving. The control portion 45 executes the third flushing in a state where the ejection unit 12 is stopped.

According to the above-described configuration, the time required for the first, second, and third flushings is shortened compared to a case where the first, second, and third flushings are executed while the ejection unit 12 is stopped one by one.

(4) The first cap portion 27 receives the liquid of the first and second flushings. The second cap portion 28 receives the liquid of the third flushing.

The first nozzles 15 are maintained moist by the first cap portion 27 contacting the first head 13. The second nozzles 17 and the third nozzles 18 are maintained moist by the second cap portion 28 contacting the second head 14. That is, according to the above-described configuration, the first cap portion 27 can serve as both a configuration for maintaining the first nozzles 15 moist and a configuration for receiving the liquid of the first and second flushings. The second cap portion 28 can serve as both a configuration for maintaining the second nozzles 17 moist and the third nozzles 18 and a configuration for receiving the treatment liquid of the third flushing. Therefore, it is possible to simplify the configuration of the liquid ejection device 11 compared to a case where a configuration of maintaining the nozzles moist and a configuration of receiving flushing are separately provided.

(5) The first cap 29 receives the liquid of the first and second flushings. The third cap 31 receives the liquid of the third flushing.

The second nozzles 17 are maintained moist by the second cap 30 contacting the second head 14. The third nozzles 18 are maintained moist by the third cap 31 contacting the second head 14. According to the above-described configuration, because the second nozzles 17 and the third nozzles 18 are maintained moist by different caps, respectively, the risk that the liquid and the treatment liquid are mixed is reduced.

(6) The maintenance unit 22 includes the first suction portion 34, coupled to the first cap 29, for suctioning the inside of the first cap 29. The maintenance unit 22 includes the second suction portion 35, coupled to the third cap 31, for suctioning the inside of the third cap 31.

In a state where the first cap 29 is in contact with the first head 13, when the first suction portion 34 suctions the inside of the first cap 29, the liquid is sucked from the first nozzles 15. By this, air bubbles and foreign matter are discharged from the first nozzles 15 together with the liquid. In a state where the third cap 31 is in contact with the second head 14, when the second suction portion 35 suctions the inside of the third cap 31, the liquid is sucked from the third nozzles 18. By this, air bubbles and foreign matter are discharged from the third nozzles 18 together with the liquid. That is, according to the above-described configuration, the first cap 29 can serve as both a configuration for suctioning the liquid from the first nozzles 15 and a configuration of receiving the liquid of the first and second flushings. The third cap 31 can serve as both a configuration for suctioning the treatment liquid from the third nozzles 18 and a configuration for receiving the treatment liquid of the third flushing. Therefore, it is possible to simplify the configuration of the liquid ejection device 11 compared to a case where a configuration of suctioning from the nozzle and a configuration of receiving flushing are separately provided.

(7) The maintenance unit 22 includes the fourth cap 38 that forms a space communicating with the second nozzles 17 by contacting the second head 14. The maintenance unit 22 includes the third suction portion 40 which is coupled to the fourth cap 38 and suctions the inside of the fourth cap 38.

In a state where the fourth cap 38 is in contact with the second head 14, when the third suction portion 40 suctions the inside of the fourth cap 38, the liquid is sucked from the second nozzles 17. Therefore, according to the above-described configuration, it is possible to discharge the bubbles and the foreign substances together with the liquid from the second nozzles 17.

Modifications

The above embodiments may be modified as follows. The above embodiments and the following modifications can be implemented in combination with each other to the extent that there is no technical contradiction.

Figure 9:
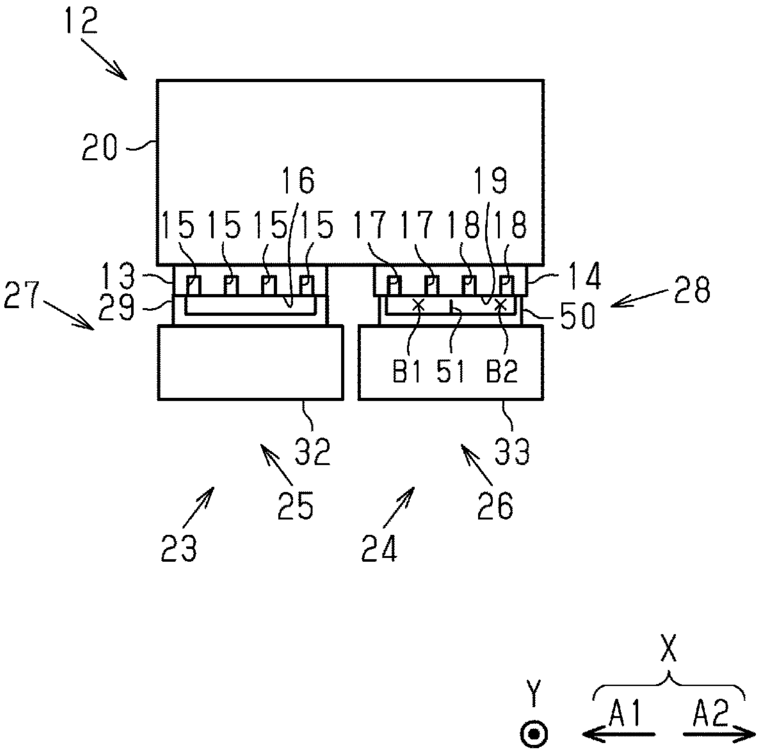
FIG. 9 is a front view showing a modification of the second receiving portion.

As shown in FIG. 9, the second receiving portion 26 may have a common cap 50. The common cap 50 is a cap that forms both a space communicating with the second nozzles 17 and a space communicating with the third nozzles 18 by contacting the second nozzle surface 19. Therefore, the common cap 50 simultaneously executes the second and third cappings.

The common cap 50 has a partition plate 51. The partition plate 51 divides the space in the common cap 50 into two in a state in which the common cap 50 caps the second head 14. When the common cap 50 caps the second head 14, a liquid space B1 and a treatment liquid space B2 are formed in the common cap 50. The liquid space B1 and the treatment liquid space B2 are partitioned by the partition plate 51. The liquid space B1 and the treatment liquid space B2 are not limited to spaces independent of each other, and may communicate with each other to such an extent that gas can be exchanged therebetween, for example. Even in this case, the common cap 50 can receive the treatment liquid of the third flushing and can maintain the second nozzles 17 and the third nozzles 18 moist. In this case, the second suction portion 35 is coupled to the treatment liquid space B2.

The control portion 45 may execute pressurization cleaning instead of suction cleaning. Pressurization cleaning is maintenance in which air bubbles and foreign substances are discharged from the nozzles together with the liquid by pressurizing the inside of the head. In this case, the liquid ejection device 11 includes a pressurizing portion that pressurizes the inside of the head. Pressurization cleaning is executed by pressurizing the inside of the head by the pressurizing portion. The first receiving portion 25 receives the liquid discharged from the first nozzles 15 and the second nozzles 17 by pressurization cleaning. The second receiving portion 26 receives the treatment liquid discharged from the third nozzles 18 by pressurization cleaning. In the case of a configuration in which pressurization cleaning is executed instead of suction cleaning, the suction mechanism 36 may not be provided.

The liquid ejection device 11 may be configured to be capable of executing both suction cleaning and pressurization cleaning.

The first flushing may be executed in a state where the ejection unit 12 is moving. This is useful in a case where the first head 13 does not face the first receiving portion 25 when the ejection unit 12 is positioned at the origin position.

The second flushing may be executed in a state where the ejection unit 12 is stopped. This is useful in a case where the second head 14 faces the first receiving portion 25 when the ejection unit 12 is positioned at the origin position. In this case, the second flushing may be executed prior to the first and third flushings. In this way, the time required for the flushing process is shortened.

The third flushing may be executed in a state where the ejection unit 12 is moving. This is useful in a case where the second head 14 does not face the second receiving portion 26 when the ejection unit 12 is positioned at the origin position.

The liquid ejected by the first head 13 and the second head 14 is not limited to ink, and may be, for example, a liquid material in which particles of a functional material are dispersed or mixed in a liquid. For example, the first head 13 and the second head 14 may discharge a liquid material containing a material such as an electrode material or a pixel material used for manufacturing a liquid crystal display, an electroluminescence display, a surface emitting display, or the like in a dispersed or dissolved form.

Technical Ideas

Hereinafter, technical ideas grasped from the above-described embodiment and modifications, and operations and effects thereof, will be described.

(A) A control method of a liquid ejection device having an ejection unit configured to eject a liquid and a treatment liquid for curing the liquid onto a medium while moving in a scanning direction and a maintenance unit for maintaining the ejection unit, the ejection unit having a first head having a first nozzle configured to eject the liquid and a second head having a second nozzle configured to eject the liquid and a third nozzle configured to eject the treatment liquid, the second head is arranged side by side with the first head in the scanning direction, the maintenance unit having a first receiving portion configured to receive the liquid and a second receiving portion configured to receive the treatment liquid, the control method includes executing a first flushing in which the liquid is ejected from the first nozzle to the first receiving portion, executing a second flushing in which the liquid is ejected from the second nozzle to the first receiving portion, and executing a third flushing in which the treatment liquid is ejected from the third nozzle to the second receiving portion.

According to the above method, the first and second receiving portions separately receive the liquid and the treatment liquid, respectively. By this, the risk that the liquid and the treatment liquid are mixed in the first receiving portion or the risk that the liquid and the treatment liquid are mixed in the second receiving portion is reduced. Therefore, the risk that the liquid is cured in the receiving portion is reduced.

(B) The above control method of the liquid ejection device may be such that the second flushing is executed after the first and third flushings are executed.

According to the above method, because the second and third flushings are not executed simultaneously, the risk that the liquid and the treatment liquid are mixed is reduced.

(C) The above control method of a liquid ejection device may be such that the first flushing is executed in a state where the ejection unit is stopped, the second flushing is executed while the ejection unit is moving, and the third flushing is executed in a state where the ejection unit is stopped.

According to the above-described method, the total time required for the first, second, and third flushings is shortened compared with the case in which the first, second, and third flushings are performed while the ejection unit stops moving one by one.

(D) A liquid ejection device includes an ejection unit configured to eject a liquid and a treatment liquid for curing the liquid onto a medium while moving in a scanning direction, a maintenance unit configured to maintain the ejection unit, and a control portion, wherein the ejection unit has a first head having a first nozzle configured to eject the liquid and a second head having a second nozzle configured to eject the liquid and a third nozzle configured to eject the processing liquid, the second head is arranged side by side with the first head in the scanning direction, the maintenance unit has a first receiving portion configured to receive the liquid and a second receiving portion configured to receive the processing liquid, and the control portion executes a first flushing in which the liquid is ejected from the first nozzle to the first receiving portion, executes a second flushing in which the liquid is ejected from the second nozzle to the first receiving portion, and executes a third flushing in which the treatment liquid is ejected from the third nozzle to the second receiving portion.

According to the above-described configuration, the first and second receiving portions separately receive the liquid and the treatment liquid, respectively. By this, the risk that the liquid and the treatment liquid are mixed in the first receiving portion or the risk that the liquid and the treatment liquid are mixed in the second receiving portion is reduced. Therefore, the risk that the liquid is cured in the receiving portion is reduced.

(E) The above liquid ejection device may be such that the control portion is configured to execute the second flushing after executing the first and third flushings.

According to the above-described configuration, because the second and third flushings are not executed simultaneously, the risk that the liquid and the treatment liquid are mixed is reduced.

(F) The above liquid ejection device may be such that the control portion executes the first flushing in a state where the ejection unit is stopped, executes the second flushing while the ejection unit is moving, and executes the third flushing in a state where the ejection unit is stopped.

According to the above-described configuration, the total time required for the first, second, and third flushings is shortened compared with the case in which the first, second, and third flushings are performed while the ejection unit stops moving one by one.

(G) The liquid ejection device described above may be such that the first receiving portion includes a first cap portion that, by contacting the first head, forms a space communicating with the first nozzle, the second receiving portion includes a second cap portion that, by contacting the second head, forms a space communicating with the second nozzle and a space communicating with the third nozzle, the first cap portion receives the liquid of the first flushing and the second flushing, and the second cap portion receives the treatment liquid of the third flushing.

The first nozzle is maintained moist by the first cap portion contacting the first head. The second nozzle and the third nozzle are maintained moist by the second cap portion contacting the second head. That is, according to the above-described configuration, the first cap portion can serve as both a configuration of maintaining the first nozzle moist and a configuration of receiving the liquid of the first and second flushings. The second cap portion can serve both as a configuration for maintaining the second nozzle and the third nozzle moist, and as a configuration for receiving the treatment liquid of the third flushing. Therefore, it is possible to simplify the configuration of the liquid ejection device compared to a case where configuration for maintaining the nozzle moist and configuration for receiving flushing are separately provided.

(H) The above-described liquid ejection device may be such that the first cap portion has a first cap that forms a space communicating with the first nozzle by contacting the first head, the second cap portion has the second cap that contacts the second head to form a space in communication with the second nozzle, and the third cap that forms a space communicating with the third nozzle by contacting the second head, the first cap receives the liquid of the first and second flushings, and the third cap receives the treatment liquid of the third flushing.

The second nozzle is maintained moist by the second cap contacting the second head. The third nozzle is maintained moist by the third cap contacting the second head. According to the configuration, because the second and third nozzles are maintained moist by different caps, respectively, the risk that the liquid and the treatment liquid are mixed is reduced.

(I) The liquid ejection device may be such that the maintenance unit has a first suction portion that is coupled to the first cap and that suctions the inside of the first cap, and a second suction portion that is coupled to the third cap and that suctions the inside of the third cap.

In a state where the first cap is in contact with the first head, when the first suction portion suctions the inside of the first cap, the liquid is sucked from the first nozzles. By this, air bubbles and foreign matter are discharged together with the liquid from the first nozzle. In a state where the third cap is in contact with the second head, when the second suction portion suctions the inside of the third cap, the liquid is sucked from the third nozzles. By this, air bubbles and foreign matter are discharged from the third nozzle together with the liquid. That is, according to the above-described configuration, the first cap can serve as both a configuration of suctioning the liquid from the first nozzle and a configuration of receiving the liquid of the first and second flushings. The third cap can serve as both a configuration for suctioning the treatment liquid from the third nozzle and a configuration for receiving the treatment liquid of the third flushing. Therefore, it is possible to simplify the configuration of the liquid ejection device, compared to a case where configuration of suctioning from the nozzles and configuration of receiving flushing are separately provided.

(J) The above liquid ejection device may be such that the maintenance unit includes a fourth cap that contacts the second head to form a space in communication with the second nozzle, and a third suction portion that is coupled to the fourth cap and that suctions the inside of the fourth cap.

In a state where the fourth cap is in contact with the second head, when the third suction portion suctions the inside of the fourth cap, the liquid is sucked from the second nozzles. Therefore, according to the above-described configuration, it is possible to discharge the air bubbles and the foreign substances together with the liquid from the second nozzle.

What is claimed is:

1. A control method of a liquid ejection device including an ejection unit configured to eject a liquid and a treatment liquid for curing the liquid onto a medium while moving in a scanning direction and a maintenance unit for maintaining the ejection unit, the ejection unit including a first head having a first nozzle configured to eject the liquid and a second head having a second nozzle configured to eject the liquid and a third nozzle configured to eject the treatment liquid, the second head is arranged side by side with the first head in the scanning direction, the maintenance unit including a first receiving portion configured to receive the liquid and a second receiving portion configured to receive the treatment liquid, and the second receiving portion is arranged side by side with the first receiving portion in the scanning direction, the control method comprising:

executing a first flushing in which the liquid is ejected from the first nozzle to the first receiving portion;

executing a second flushing in which the liquid is ejected from the second nozzle to the first receiving portion; and executing a third flushing in which the treatment liquid is ejected from the third nozzle to the second receiving portion.

2. The control method of the liquid ejection device, according to claim 1, wherein the second flushing is executed after the first and third flushings are executed.

3. The control method of the liquid ejection device, according to claim 2, wherein the first flushing is executed in a state where the ejection unit is stopped, the second flushing is executed while the ejection unit is moving, and the third flushing is executed in a state where the ejection unit is stopped.

4. A liquid ejection device comprising:

an ejection unit configured to eject a liquid and a treatment liquid for curing the liquid onto a medium while moving in a scanning direction;

a maintenance unit configured to maintain the ejection unit; and a control portion, wherein the ejection unit includes a first head having a first nozzle configured to eject the liquid and a second head having a second nozzle configured to eject the liquid and a third nozzle configured to eject the treatment liquid, the second head is arranged side by side with the first head in the scanning direction, the maintenance unit includes a first receiving portion configured to receive the liquid and a second receiving portion configured to receive the treatment liquid, the second receiving portion is arranged side by side with the first receiving portion in the scanning direction, and the control portion executes a first flushing in which the liquid is ejected from the first nozzle to the first receiving portion, executes a second flushing in which the liquid is ejected from the second nozzle to the first receiving portion, and executes a third flushing in which the treatment liquid is ejected from the third nozzle to the second receiving portion.

5. The liquid ejection device, according to claim 4, wherein the control portion is configured to execute the second flushing after executing the first and third flushings.

6. The liquid ejection device, according to claim 5, wherein the control portion executes the first flushing in a state where the ejection unit is stopped, executes the second flushing while the ejection unit is moving, and executes the third flushing in a state where the ejection unit is stopped.

7. The liquid ejection device, according to claim 4, wherein the first receiving portion includes a first cap portion that, by contacting the first head, forms a space communicating with the first nozzle, the second receiving portion includes a second cap portion that, by contacting the second head, forms a space communicating with the second nozzle and a space communicating with the third nozzle, the first cap portion receives the liquid of the first and second flushings, and the second cap portion receives the treatment liquid of the third flushing.

8. The liquid ejection device, according to claim 7, wherein the first cap portion includes a first cap that forms a space communicating with the first nozzle by contacting the first head, the second cap portion includes the second cap that contacts the second head to form a space in communication with the second nozzle and the third cap that forms a space communicating with the third nozzle by contacting the second head, the first cap receives the liquid of the first and second flushings, and the third cap receives the treatment liquid of the third flushing.

9. The liquid ejection device, according to claim 8, wherein the maintenance unit includes a first suction portion that is coupled to the first cap and that suctions the inside of the first cap and a second suction portion that is coupled to the third cap and that suctions the inside of the third cap.

10. The liquid ejection device, according to claim 9, wherein the maintenance unit includes a fourth cap that contacts the second head to form a space in communication with the second nozzle and a third suction portion that is coupled to the fourth cap and that suctions the inside of the fourth cap.

* * * * *